E. L. Roberts.
House Ventilation.
N° 79,395. Patented Jun. 30, 1868.
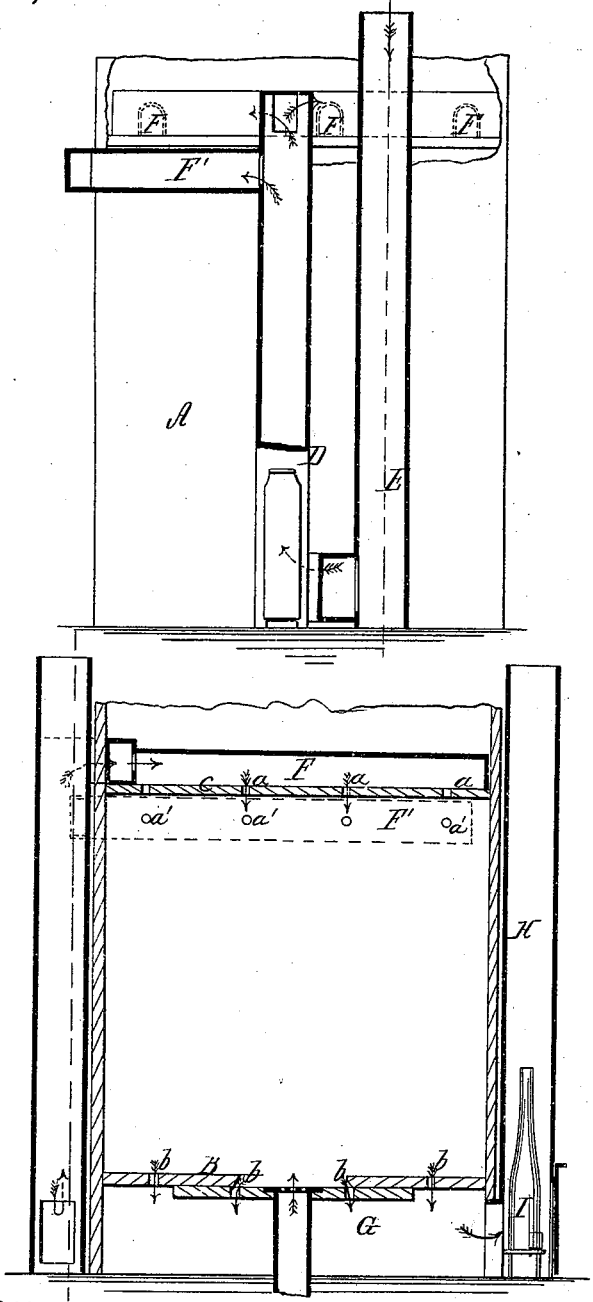
Witnesses,
W. C. Ashketter
Wm. A. Magan
Inventor,
E. L. Roberts
per Munn & Co.
Attorneys

United States Patent Office.

E. L. ROBERTS, OF NEW YORK, N. Y.

Letters Patent No. 79,395, dated June 30, 1868.

---

IMPROVEMENT IN VENTILATORS.

---

*The Schedule referred to in these Letters Patent and making part of the same.*

---

TO ALL WHOM IT MAY CONCERN:

Be it known that I, E. L. ROBERTS, of New York, in the county of New York, and State of New York, have invented a new and useful Improvement in Ventilating and Heating Buildings; and I do hereby declare that the following is a full, clear, and exact description thereof, which will enable others skilled in the art to make and use the same, reference being had to the accompanying drawings, forming part of this specification, in which—

Figure 1 represents a sectional elevation of a building provided with my improved ventilating and heating-apparatus.

Figure 2 is a side elevation of the same, with parts broken away.

Similar letters of reference indicate like parts.

The nature of my invention relates to improvements in ventilating and heating buildings, whereby it is designed to provide a more effective and useful means of accomplishing the same than any now in use.

Hitherto, among the various devices and arrangements resorted to for the purpose, no general and comprehensive plan has been found out, suitable for buildings of all kinds, and for all seasons and conditions of weather, although, perhaps, some plans, possessing more or less merit of a temporary character, and suited to certain conditions, may have been devised.

My invention is calculated to accomplish perfect ventilation in all parts of a room or building, whether large or small, and a uniform heating of the same, at all times and seasons, by causing a constant, steady, and uniform flow of fresh air into and through the room, in a manner to be diffused throughout the whole space, and taking up and carrying off all impure and noxious air or vapor that may be discharged into the room by any cause.

To this end my invention consists—

First, in providing, in combination with means for producing the said distributed supply and exhaust, means for effecting a forced exhaust, whereby a copious flow of fresh air may be at all times maintained throughout the room, irrespective of the condition of the atmosphere without.

Second, in providing a means for thoroughly mixing heated air with the supply of fresh air, at or near the top of the room, or in the space above that occupied by the occupants, in cold weather, and diffusing the same throughout the room, and at the same time keeping a constant flow of fresh air through the room.

Third, in the combinations and arrangements of apparatus for accomplishing the above-mentioned objects, as will be more fully described.

In the accompanying drawings, A represents a side elevation of a building, of which B may represent the floor, and C the ceiling. D represents an air-supply tube standing in a vertical position by the side of the building, or in any convenient position relatively thereto, which is closed at the top, and provided with means for opening communication at the bottom, to receive the air directly from the external atmosphere, or for receiving it from another vertical tube or hollow shaft, E, which is open at the top and closed at the bottom to the external atmosphere, but communicating with the tube D, and provided with a valve for opening or closing said communication, as desired.

At the top of the tube D, communication is provided with distributing-tubes F' arranged above the ceiling, and provided with small openings, $a$, communicating through the ceiling with the room to be ventilated, or, as may be preferable in some cases, the tube D, at the upper end, or at a point near the top of the room, is connected to the distributing-tubes F' arranged upon the outside of the wall, or within the same, or it may be within the room near the top in the place of the cornice, which is also provided with small openings, $a'$, into the room.

Various plans may be adopted for introducing the air upon the principle of my invention, which may serve equally well, provided the essential features be preserved, which, according to the first and second parts of my invention, consist in conveying the air from near the level of the floor to the top of the room, or near the same, and distributing it throughout the whole surface of the same, as above described.

One, or any other number of such shafts may be provided, as may be convenient. By this arrangement, a passage for a supply of fresh air into the rooms near the ceiling may be kept constantly open, and at the same time the tendency of the air in the room to escape is checked, being balanced by the column of cold air in the shaft communicating at its lower opening with the atmosphere. The undue pressure of the air into the shaft from strong winds may be regulated by an automatic valve.

When the building to be ventilated is composed of several stories, the supply may be carried to each story by separate supply-tubes, or by separate flues in the same tube, and the tubes may be provided with valves to direct the flow to each story, as desired.

To provide for diffusing the fresh air, which is so received through the top of the room, and mixing it with that which has become vitiated and increased in temperature by the heat given off from the occupants of the room, or, which may be imparted to it from other causes, and for conveying the whole air out of the room to keep up a constant flow, giving place for a like inward flow of fresh air, I have provided a means of exhausting the same through the floor, as shown in fig. 2.

G represents a space under the floor of the room, through which communication is opened with the room, and which also has communication with a high vertical shaft, H, through which a draught will naturally flow, drawing the air from the room, causing a partial vacuum therein, which will readily be filled by the inflow of air from the tube D, as before described.

To further facilitate the dissemination and equalization of the flow of fresh air, and for more thoroughly removing the vitiated air from the room, I have arranged a system for distributing the discharge or exhaust-passages throughout the floor of the room. I have found, by long-continued and extensive practice, that no room can be well ventilated without a constant action being maintained in the air throughout the whole space of the room, and that it is also highly important that the said action be uniformly alike in all parts. In the various efforts heretofore made, I have found serious defects existing in this respect; as, for instance, from want of means for causing a distributed and thorough flow, as above described, especially in large buildings, and those having high ceilings and galleries, it is generally found that, while in some limited portions of the room contiguous to a window that may be opened, or to a register over a window, there may be some circulation of currents of air, the greater mass of air will be found to be lying in a quiet state in various strata, with the coldest portion at the bottom, and the warmer at the top, while that portion which is vitiated, and deprived of its oxygen by being repeatedly inhaled and discharged from the human lungs, is found in an intermediate stratum between those above mentioned, and about the position of the heads of the occupants.

To move this mass of air thoroughly, and with equal results with reference to all the occupants of all parts of the room, I have found that it must be done either in an upward or downward direction, as, by an attempt to move it from one side to another of a room, those persons upon the receiving side would be unduly exposed to the fresh air, when it might be too cold, or they might be benefited by it more than those on the opposite side, as in passing from one side to another it would become more or less vitiated.

The difficulty also of moving the air in a horizontal plane could not be easily overcome, as in a large building, under such an arrangement, the upper portion of the room would be the warmest, and the air, after entering at the right place, would rise and pass above the central portion of an audience, although it might be caused to descend again to the proper place for passing out, thus leaving a larger portion in a body of air that would not be moved.

Another difficulty of such a plan would be in furnishing a sufficient supply of fresh air within the limited horizontal plane from which it could be breathed by an audience.

And in respect to moving the air in an upward direction, I have encountered serious difficulties in devising a plan suitable for all seasons, for while that it may do well for seasons when it is not necessary to heat the air, in such seasons when heating is required, the heated air would escape too rapidly, and the expense would be enormously increased.

I have, therefore, provided, in conjunction with the before-mentioned arrangement for distributing the supply of fresh air, a plan for equally distributing the exhaust in a downward direction, through the floor. When it is not convenient to provide a large space under the floor, as at G, in the example herein shown, which may be made use of, I provide a series of lateral tubes or passages, communicating with rows of passages, $b$, through the floor, and with a main duct or channel leading to the exhaust-tube H, whereby the whole volume of air in a room is constantly kept in motion, and each individual may be said to be provided with a descending column of fresh air, having a superficial area equal to that which he occupies in a closely-packed room; or if the room be thinly occupied, he will be enveloped in a column correspondingly larger, and provided with an equal amount of exhaust.

In like manner, when the building is composed of more than one story, the system of exhaust-passages, which I have described to be arranged under the floor, may be arranged under the floor of every story, and communication from each story be made with the exhaust-shaft, or it may be continued downward through the several stories to the exhaust-shaft at the bottom, if preferred.

The means which I have thus far described, I have found to be generally efficient for ordinary purposes and times when the atmosphere is in an active condition; but for large buildings, and for times when the air is heavy and dull, and in cold weather, when it is desirable to heat the rooms as well as to ventilate them, I have found it necessary to provide a means for accelerating the draught of the exhausting-apparatus, and for that purpose I have provided, in combination with the above-described means for producing a distributed exhaust, within the flue or shaft H, at any convenient position therein, a heater, I, for the purpose, when necessary, of generating heat for rarefying the air within the shaft, whereby the draught may be accelerated to any desired extent, or regulated according to the circumstances of the case.

In the colder seasons of the year, it is necessary to raise the temperature of the air received from without, as above described, by means of my improved ventilating-apparatus, and for this purpose my improvement possesses peculiar and important advantages.

I provide a heater, which may be of the ordinary construction, arranged below the floor of the room, and the heated air conveyed therefrom and discharged into the room in tubes, or the room may be heated by stoves within the same. Now, as is well known, the heated air, however discharged into the room, will, while warm, rise immediately upward. It therefore, according to my improvement, encounters, near the top of the room, the incoming diffused currents of cold air, moving in an opposite direction, and mixes with the same, and as by reason of the cold-air-supply tube D being arranged to convey the supply from near a level with the floor of the room, the column of cold air therein being heavier than the warmer air within the room, the said heated air cannot escape through the cold-air passages, but is diffused and thoroughly mixed with the same, and carried gradually, constantly, and imperceptibly downward to the exhaust-passages through the floor, in a column pervading the whole area of the room, the velocity of which may be governed entirely by a damper or valve in the exhaust-shaft, and the temperature of which has, by the thorough mixing of the heated air with the cold air, been brought to the required degree by the time it reaches the occupants of the room.

An important feature of my improved ventilating and heating-apparatus is by reason of the facility it affords for governing the velocity of the flow of air without producing undue activity in any part of the room. The capacity of the supply and exhaust-passages may be made ample to afford a flow equal to the utmost demands of any room, however it may be packed, as in churches, theatres, and other public assemblages. The exhaust-passages may be provided with registers, and, if desired, the flow may be stopped in any portion of the room, and the exhaust confined to any desired portion.

I am aware that it is common to produce currents of air for ventilation, both for supply and exhaust, by mechanical means, and also by changing the temperature of the air, and I therefore do not claim such means broadly; but, having thus described my invention,

I claim as new, and desire to secure by Letters Patent—

1. In combination with means for effecting a distributed exhaust, as above described, means for effecting a forced exhaust, substantially as and for the purpose described.

2. Mixing heated air, for heating rooms, with the inflowing distributed supply of fresh air, at or near the top of the room, by means substantially as and for the purpose described.

3. The combination, with the supply-passages F or F', at or near the top of the room, of the vertical tube D, substantially as and for the purpose described.

4. The combination, with the tube D, of the tube E, substantially as and for the purpose described.

5. The combination, with the supply-passages through the ceiling, or near the same, and the vertical supply-tube D, of the exhaust-passages through the floor, substantially as and for the purpose described.

6. The combination, with a floor arranged as described, for effecting a distributed exhaust, of the flue H, provided with a heater, substantially as and for the purpose specified.

The above specification of my invention signed by me, this thirteenth day of April, 1868.

E. L. ROBERTS.

Witnesses:
ALEX. F. ROBERTS,
J. M. COVINGTON.